(12) United States Patent
Kim

(10) Patent No.: US 9,173,274 B2
(45) Date of Patent: Oct. 27, 2015

(54) LIGHTING CONTROL DEVICE AND METHOD

(71) Applicant: LG INNOTEK CO., LTD., Seoul (KR)

(72) Inventor: Dae Hun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/278,909

(22) Filed: May 15, 2014

(65) Prior Publication Data

US 2014/0246991 A1    Sep. 4, 2014

Related U.S. Application Data

(63) Continuation of application No. 14/017,902, filed on Sep. 4, 2013.

(30) Foreign Application Priority Data

Sep. 4, 2012  (KR) .................. 10-2012-0097924

(51) Int. Cl.
| | | |
|---|---|---|
| G03F 1/00 | (2012.01) | |
| H05B 37/02 | (2006.01) | |
| H05B 39/04 | (2006.01) | |
| H05B 41/36 | (2006.01) | |
| H05B 33/08 | (2006.01) | |

(52) U.S. Cl.
   CPC ............ *H05B 37/02* (2013.01); *H05B 33/0863* (2013.01); *H05B 37/0227* (2013.01); *H05B 37/0272* (2013.01); *Y02B 20/48* (2013.01)

(58) Field of Classification Search
   None
   See application file for complete search history.

(56) References Cited

U.S. PATENT DOCUMENTS

| | | | |
|---|---|---|---|
| 7,358,961 B2 * | 4/2008 | Zwanenburg | 345/173 |
| 8,217,595 B2 | 7/2012 | Van Endert | |
| 8,278,845 B1 * | 10/2012 | Woytowitz | 315/307 |
| 8,342,714 B1 * | 1/2013 | Rea et al. | 362/264 |
| 8,579,452 B2 * | 11/2013 | Diederiks et al. | 362/85 |
| 2008/0291673 A1 | 11/2008 | Chen et al. | |
| 2008/0315798 A1 | 12/2008 | Diederiks et al. | |

(Continued)

FOREIGN PATENT DOCUMENTS

| | | | |
|---|---|---|---|
| JP | H07-147192 A | 6/1995 | |
| JP | H07-272866 A | 10/1995 | |

(Continued)

OTHER PUBLICATIONS

Mott, S. Michael, et al., Illuminating the Effects of Dynamic Lighting on Student Learning, 10 pages, Sage Publications, May 6, 2012, <retrieved from http://sgo.sagepub.com/content/2/2/2158244012445585.full-text.pdf+html>.*

(Continued)

*Primary Examiner* — Douglas W Owens
*Assistant Examiner* — Dedei K Hammond
(74) *Attorney, Agent, or Firm* — Saliwanchik, Lloyd & Eisenschenk

(57) ABSTRACT

Embodiments relate to controlling a lighting control according to at least one of received signal strength indication (RSSI) and a preset lighting mode. Brightness or/and color temperature of the lighting device may be automatically controlled to two or more levels according to the RSSI and a user's taste. A switch application of the lighting device using the RSSI is operated to facilitate a control by a user, and On/Off or/and brightness of the lighting device are controlled according to the RSSI.

15 Claims, 17 Drawing Sheets

(56) References Cited

U.S. PATENT DOCUMENTS

| | | |
|---|---|---|
| 2009/0002981 A1 | 1/2009 | Knibbe |
| 2009/0059603 A1 | 3/2009 | Recker et al. |
| 2009/0156251 A1 | 6/2009 | Cannistraro et al. |
| 2010/0214250 A1 | 8/2010 | Gillespie et al. |
| 2011/0084901 A1 | 4/2011 | Diederiks |
| 2011/0140864 A1 | 6/2011 | Bucci |
| 2011/0309933 A1 | 12/2011 | Marino |
| 2012/0049759 A1 | 3/2012 | Pezzutti et al. |
| 2012/0217882 A1 | 8/2012 | Wong et al. |
| 2012/0320262 A1* | 12/2012 | Chung .......................... 348/370 |
| 2013/0104017 A1 | 4/2013 | Ko et al. |
| 2013/0285576 A1* | 10/2013 | Van Der Zande et al. .... 315/360 |

FOREIGN PATENT DOCUMENTS

| | | |
|---|---|---|
| JP | 2004532477 A | 10/2004 |
| JP | 2008293946 A | 12/2008 |
| JP | 2009-017267 A | 1/2009 |
| JP | 2009-087834 A | 4/2009 |
| JP | 2009-521089 A | 5/2009 |
| JP | 2011014341 A | 1/2011 |
| JP | 2011-508485 A | 3/2011 |
| JP | 2011-175757 A | 9/2011 |
| JP | 2012507822 A | 3/2012 |
| KR | 10-2007-0018601 A | 2/2007 |
| KR | 10-2007-0105773 A | 10/2007 |
| KR | 10-2012-0064457 A | 6/2012 |
| KR | 10-2012-0079237 A | 7/2012 |
| WO | WO-2007/052195 A1 | 5/2007 |
| WO | WO-2007/072316 A2 | 6/2007 |
| WO | WO-2009-020370 A2 | 8/2009 |
| WO | WO-2009/150572 A1 | 12/2009 |
| WO | WO 2010019624 A1 * | 2/2010 |
| WO | WO-2010/131155 A1 | 11/2010 |
| WO | WO-2012/046189 A1 | 4/2012 |

OTHER PUBLICATIONS

Office Action dated May 27, 2014 in Japanese Application No. 2013-158536.

European Search Report dated Dec. 17, 2013 in European Application No. 13176479.7-1807

Office Action dated Aug. 26, 2014 in U.S. Appl. No. 14/017,902.

European Search Report in European Application No. 14183965.4.

Office Action dated Nov. 13, 2014 in Korean Application No. 10-2014-0018144.

Office Action dated May 29, 2015 in Korean Application No. 10-2014-0018144.

Office Action dated Feb. 18, 2015 in U.S. Appl. No. 14/017,902 filed Sep. 4, 2013.

Office Action dated May 12, 2015 in Japanese Application No. 2014-160188.

* cited by examiner

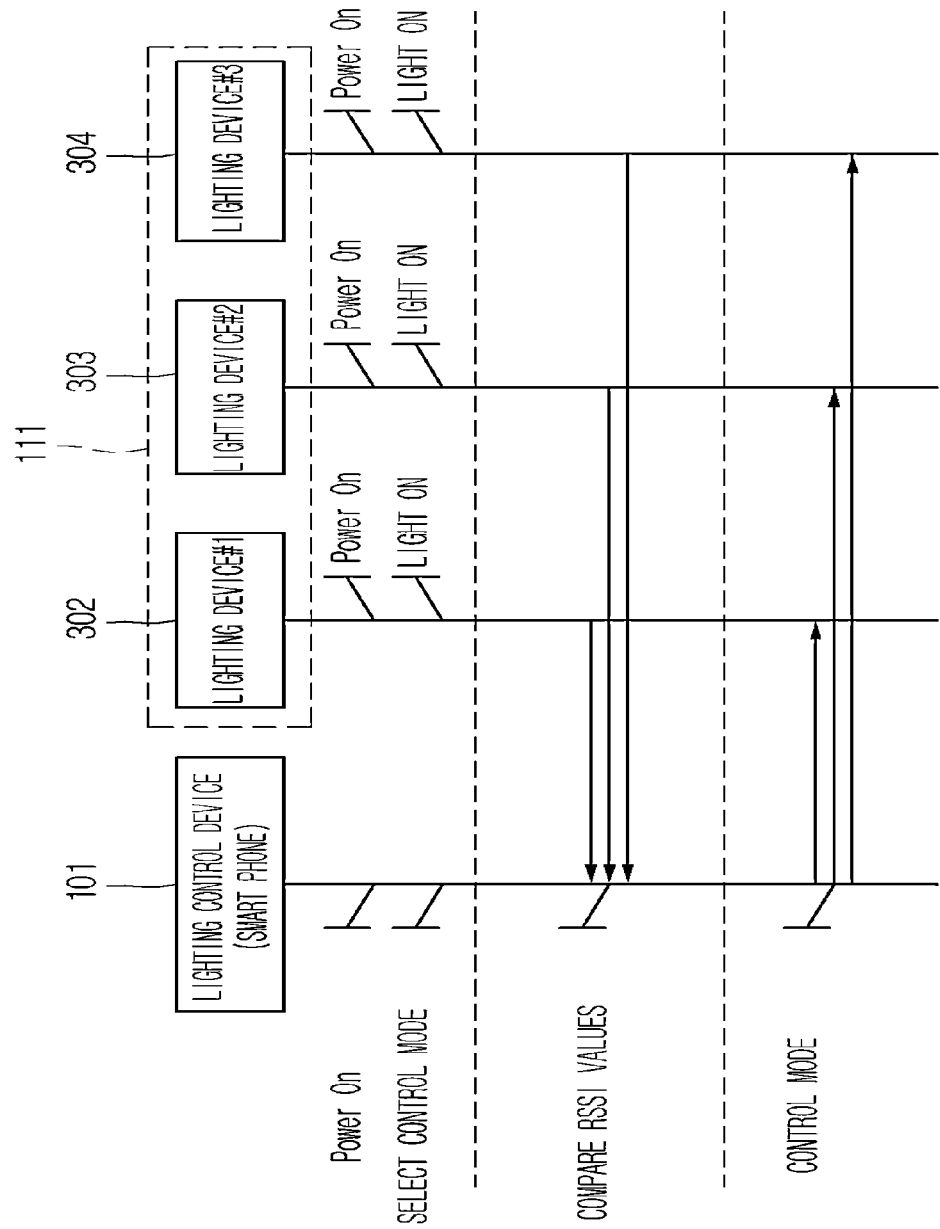

LIGHTING CONTROL DEVICE AND METHOD

CROSS-REFERENCE TO RELATED APPLICATION

This application is a continuation of U.S. application Ser. No. 14/017,902, filed Sep. 4, 2013, which claims the benefit under 35 U.S.C. §119 of Korean Patent Application No. 10-2012-0097924, filed Sep. 4, 2012, which is hereby incorporated by reference in its entirety.

BACKGROUND

Embodiments relate to controlling a lighting device based on at least one of a received signal strength indication (RSSI) received from the lighting device, and a preset lighting mode.

A general lighting device may be controlled when a power switch and a lighting device are connected one to one and a desired switch is known.

Also, color temperature or/and brightness of each lighting device should be manually controlled based on a user's determination.

Further, when a user goes out or returns to home, the user has to turn off or on each lighting device, personally.

The above-mentioned control method, however, causes inconvenience in use since the user personally performs an action.

Meanwhile, as one of endeavors toward environment-friendly/low carbon energy and energy saving, social and national needs for an LED lighting have been sharply increased. However, in spite of efficiency and technical advantages of the LED lighting, the LED lighting has a realistic problem in that it is not widely used due to a high prices and a limitation in technical difference able to overcome the price issue compared to an existing lighting device.

BRIEF SUMMARY

Embodiments provide an effective control of a lighting device based on a received signal strength indication (RSSI) received from the lighting device.

Embodiments provide a control of brightness or/and color temperature of a lighting device to two or more levels according to RSSI.

For example, embodiments provide realizing an emotional control of lighting based on a user's taste by differently setting a color control signal, a color temperature signal, and a brightness signal of a lighting device according to RSSI at an Application Software of a smart phone that is one type of lighting control devices.

Also, when a user with a lighting control device goes into a place where a lighting device is installed, the lighting device is controlled to be automatically turned on, when the user approaches or moves away from the lighting device, the level of brightness/color temperature may be controlled to be increased or decreased, or when the user goes out the place, the lighting device is turned off, to thus enable the emotional control.

Embodiments provide a lighting control device which is able to be easily controlled by a user by when a plurality of wireless lighting devices are installed, operating a switch application of the lighting device which is positioned at the nearest place according to the RSSI (i.e., having the highest RSSI) to display a user interface (UI) outputting lighting control information on a display unit of a smart phone that is one type of lighting control devices.

Embodiments provide an apparatus for controlling a lighting device in which as one example that a switch application of a lighting device to be controlled is outputted on a display unit of the lighting device, a switch application (UI) of the lighting device having the highest RSSI is outputted as a main picture, and a switch application (UI) of the lighting device having the RSSI of not less than a preset RSSI is outputted as a sub-picture. It is natural that the main picture and the sub-picture may be outputted in the same size.

Embodiments provide a lighting control device which controls a lighting device to be turned on when an RSSI is received from the light device. Also, embodiments provide a lighting control device in which brightness of a lighting device is set to be varied with the RSSI.

For example, the brightness level of an indoor room may be automatically gradually lowered when a user goes out, and may be automatically gradually elevated when the user enters the indoor room.

Further, embodiments propose that brightness/color temperature is varied with the RSSI. For example, embodiments propose that as the RSSI increases, the level of brightness/color temperature gradually increases, and as the RSSI decreases, the level of brightness/color temperature gradually decreases.

Embodiments may set a lighting control device such that a lighting device is controlled only with respect to the RSSI of not less than a preset RSSI, or is controlled according to a value obtained by comparing received RSSIs regardless of a preset RSSI.

Embodiments provide convenience in control of a lighting device by presetting various lighting control modes by at least brightness or/and color temperature among lighting control information of the lighting device or displaying the same in an icon.

In one embodiment, a lighting control device includes: a storage unit storing at least one of color temperature and brightness level corresponding to an RSSI received from a lighting device; a communication unit transmitting a signal for controlling the lighting device; a display unit outputting lighting control information corresponding to the RSSI received from the lighting device; and a control unit controlling the lighting device based on the RSSI received from the lighting device, and at least one of the color temperature and the brightness level stored in the storage unit.

In another embodiment, a lighting control device includes: a communication unit transmitting a signal to the lighting control device and receiving different lighting control signals from the lighting control device according to different signal strengths corresponding to the outputted sigma; a storage unit storing lighting control information to be controlled; and a control unit controlling the lighting device based on the different lighting control signals received from the lighting control device.

In further another embodiment, a lighting control method includes: turning on powers of a lighting control device and a lighting device; selecting a lighting control mode of the lighting control device for controlling the lighting device; confirming a RSSI of a signal received from the lighting device; confirming the received RSSI and lighting control information of the lighting device stored corresponding to the received RSSI; and controlling at least one of color temperature and brightness of the lighting device based on the confirmed results.

In another embodiment, a lighting control method includes: turning on powers of a lighting control device and a lighting device; selecting a lighting control signal for controlling the lighting device; selecting the lighting device to be controlled based on an RSSI of a signal received from the lighting device; and outputting lighting control information of the selected lighting device on a display unit.

In another embodiment, a lighting control method includes: setting and storing two or more lighting control modes based on at least one of color temperature and brightness that are lighting control information; selecting one of the two or more lighting control modes by the lighting control device; displaying the set/stored lighting control mode according to the selection; and controlling the lighting device based on any one of a preset mode among the lighting control modes displayed, and the selected mode.

According to embodiments, the lighting device can be effectively controlled by controlling color temperature or/and brightness of the lighting device based on the RSSI received from the lighting device and allowing the lighting device which will be controlled to be displayed.

According to embodiments, the lighting device can be controlled variously according to a user's taste by controlling the brightness and color temperature of the lighting device to two or more levels according to the RSSI.

According to embodiments, in case two or more wireless lighting devices are installed, a user can easily control the lighting devices by allowing a user interface (UI) to be displayed on a display unit of a smart phone that is one type of control devices by a switch application of the lighting device positioned at the nearest place (having the highest RSSI).

According to embodiments, a user can easily control the lighting device by in outputting a UI by a switch application of a lighting device to be controlled based on an RSSI on a display unit of the lighting device, allowing a UI by a switch application (UI) of the lighting device having the highest RSSI to be outputted as a main picture, and allowing a UI by a switch application of the lighting device having the RSSI of not less than a preset RSSI to be outputted as a sub-picture.

According to embodiments, the lighting device may be controlled such that the brightness level of the lighting device of an indoor room is automatically lowered when a user goes out, and is automatically elevated when the user enters the indoor room. For example, as the RSSI increases, the level of color temperature/brightness is gradually elevated (brightened), and as the RSSI decreases, the level of color temperature/brightness is gradually lowered (darkened).

According to embodiments, the lighting device may be controlled to be automatically turned off when a user goes out and to be automatically turned on when the user enters an indoor room according to the RSSI, and the lighting device may be set such that as the RSSI increases, the brightness level increases (is brightened), and as the RSSI decreases, the brightness level decreases (is darkened).

According to embodiments, the lighting device may be conveniently controlled by presetting various lighting modes based on at least brightness or/and color temperature among lighting control information, and displaying the preset lighting modes in icons.

The details of one or more embodiments are set forth in the accompanying drawings and the description below. Other features will be apparent from the description and drawings, and from the claims.

BRIEF DESCRIPTION OF THE DRAWINGS

FIG. 3 is a schematic view illustrating a process of controlling lighting devices by using a wireless smart phone and an RSSI.

DETAILED DESCRIPTION

Figure 1:
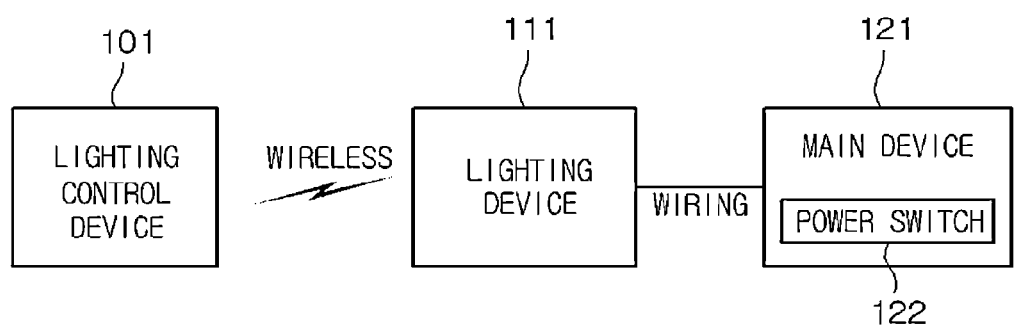
FIG. 1 is a block diagram of a general lighting system according to an embodiment.

Reference will now be made in detail to the embodiments of the present disclosure, examples of which are illustrated in the accompanying drawings.

A lighting control device and method according to embodiments will now be described with reference to the accompanying drawings.

The terms used in the embodiments are terms generally, widely used in these days if possible, but in a specific case, the terms are arbitrarily selected by the inventor and in the case, operations and meanings of the selected terms are described in detail in corresponding embodiments. Therefore, the embodiments should be understood based on the operations and meanings of the terms not on the naming of the terms.

In description of embodiments, a lighting device indicates an apparatus including an LED, a general lighting device, other lighting devices, a fluorescent lamp, a glow lamp, a downlight, a halogen lamp, etc.

Also, in the description of embodiments, while Zigbee or Bluetooth is exemplarily described as a communication system of a communication module used in a communication unit within the lighting device, the embodiments are not limited thereto but may be applied to other communication systems, such as WiFi, NFC, or the like.

Also, in the description of embodiments, a connection between elements, and an access or contact to each element include a mechanical connection, an electrical connection, or a wiring/wireless connection via another element, another medium, or another unit as well as a direct connection.

Further, in the description of embodiments, while color temperature or/and brightness of lighting devices are mainly explained as control information, they are only exemplary, and another control information, such as a color control signal and the like may be included.

In the description of embodiments, a UI picture will be outputted by an operation of a switch application. In embodiments, it may be understood that the switch application being outputted means that UI pictures are outputted by an operation of the switch application. Therefore, the expression of the switch application being outputted includes the output of the UI picture.

Also, information for controlling the lighting device, including the UI may be outputted by the operation of the switch application.

A general description for embodiments will be given first.

The brightness or/and color temperature of the lighting device is set to two or more levels according to the RSSI such that it is controllable by a user's taste.

Also, when a user having the lighting control device enters a place where the lighting device is installed, the lighting device is automatically turned on, and when the user approaches or moves away the lighting device, the level of brightness/color temperature is elevated or lowered according to the preset RSSIs to enable the emotional control of lighting.

Also, in an environment provided with a wireless lighting control system capable of controlling two or more lightings, the embodiments provide improvement and convenience in user interface (UI).

For example, in a home environment capable of performing a wireless lighting control using a smart phone that is one type of lighting control devices, the embodiments are intended to control the lighting device according to the RSSI so as to get rid of inconvenience that a user searches one by one a corresponding program in the smart phone so as to use a plurality wireless control applications including a wireless lighting control. That is, in case a plurality of wireless lighting devices are installed, a UI by the switch application of the nearest lighting device as judged from the RSSI of the smart phone that is one type of the lighting control devices is displayed to secure user convenience in control, and the lighting control device may be set such that when the received RSSI approaches a preset RSSI, the lighting device is turned on and thus the brightness/color temperature is changed.

In the above, the near distance includes a distance capable of providing a convenient function such that the switch application of the lighting device near to the user is able to be displayed when a plurality of wireless lighting devices are installed in a home or building. Generally, a user carries a smart phone that is one type of the lighting control devices, and the smart phone has table information preset between the lighting device and the RSSI.

Also, the lighting device may be conveniently controlled by presetting various lighting modes based on at least brightness or/and color temperature among lighting control information, and displaying the preset lighting modes in icons.

FIG. 1 is a block diagram of a general lighting system according to an embodiment.

Referring to FIG. 1, in a lighting control device 101 including an input means (not shown) for inputting a user command to control a lighting device via a wireless control system, and a lighting device 111 including a lighting unit (e.g., LED, other lighting devices) (not shown), and a signal receiving means (not shown), the lighting device 111 may receive a user control command from the lighting control device 101.

Meanwhile, the control of the lighting device 111 may be performed not by the above-mentioned wireless system but by a separate wiring system.

That is, as shown in FIG. 1, a main device 121 for directly controlling the lighting device 111 is provided, and is provided with a power switch 122 for controlling ON/OFF of the lighting device 111. The power switch is connected to the lighting device 111 via a wiring system, and is a switch built in a wall.

Meanwhile, the embodiments will describe a wireless lighting control system.

The system shown in FIG. 1 may be operated by one of various radio frequency (RF) communication systems, such as Zigbee, WiFi, BLUETOOTH, or the like, and is operated by a wireless communication system selected by a user or for communication between devices.

Figure 2A:
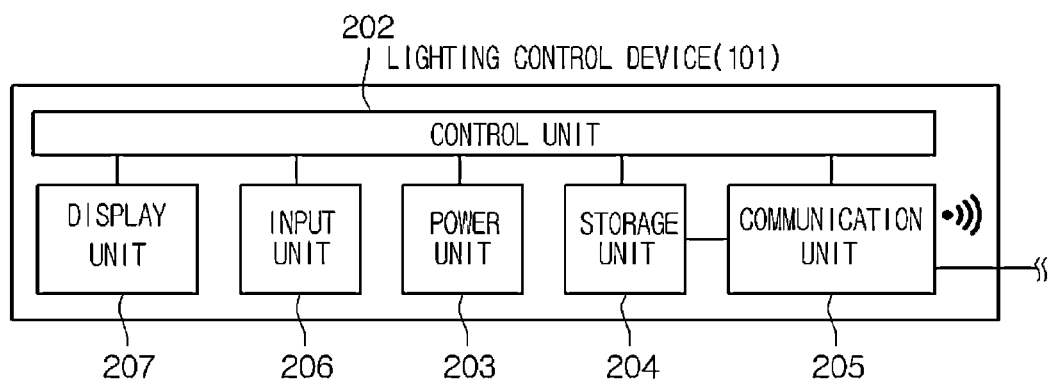
FIGS. 2A and 2B are block diagrams showing constructions of a lighting control device and a lighting device constituting a lighting system.
Figure 2B:
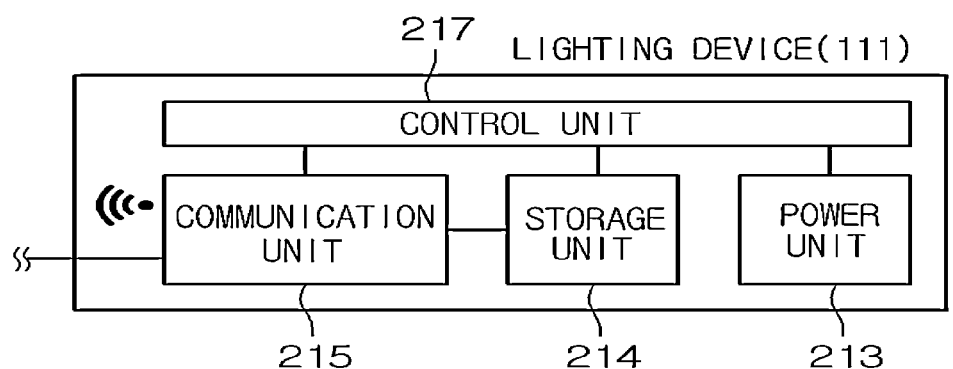

FIGS. 2A and 2B are block diagrams showing constructions of the lighting control device 101 and the lighting device 111 constituting a lighting system.

First, as shown in FIG. 2A, the lighting control device 101 includes: a power unit 203; an input unit 206 for inputting a user command; a display unit 207 outputting a UI by a switch application for control of the lighting device 111; a communication unit 205 transmitting a signal for control of the lighting device according to the communication method; a storage unit 204 storing at least one of color temperature and brightness of the lighting device to be controlled according to an RSSI received from the lighting device; and a control unit 202 controlling the lighting device based on the RSSI received from the lighting device, and at least one of the color temperature and the brightness level stored in the storage unit.

A switch application for outputting lighting control information based on the RSSI received from the lighting device is stored in the storage unit 204 of the lighting control device 101.

A UI 400 capable of controlling at least one of a color temperature 401 and brightness 403 (see FIG. 4) according to the RSSI received from the lighting device 111 is outputted on the display unit 207 of the lighting control device 101.

Also, a UI (see FIG. 8) for one or more lighting devices to be controlled according to the RSSI received from the lighting device 111 of FIG. 2B is displayed on the display unit 207 of the lighting control device 101 such that a user may perform a control.

Figure 8:
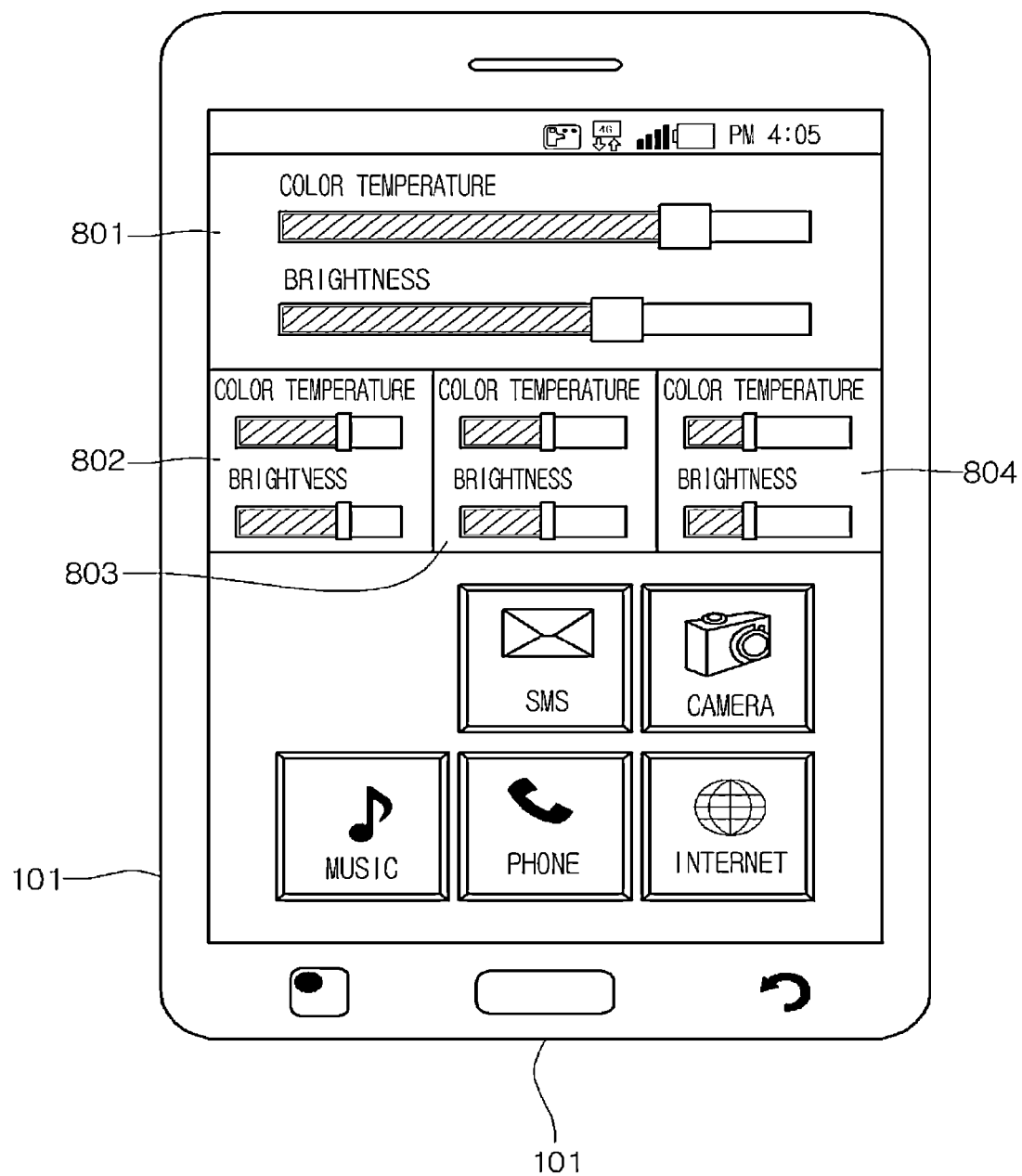
FIG. 8 is a schematic view illustrating that lighting control information of a lighting device to be controlled is outputted on a UI by a switch application of a lighting control device.

From the comparison of the RSSI values, the UI 801 of the lighting device having the highest RSSI value is generally outputted on the display unit of the lighting control device, but the embodiment is not limited to, and a plurality of UIs 802, 803, and 804 may be outputted on the display unit by the switch application as shown in FIG. 8.

Also, it is general that the UI of the lighting device having the RSSI value of not less than a preset RSSI value is outputted, but the embodiment is not limited thereto, and all of the lighting devices having the RSSI may be outputted.

From the comparison of the RSSI values received from the lighting devices, the switch application of the lighting device having the highest RSSI value may be outputted as a main picture on the display unit of the lighting control device, and the switch applications of the lighting devices having the RSSI value of not less than a preset RSSI value may be outputted as a sub-picture by a setting.

The lighting device outputted in the main picture has the highest RSSI (−40 dBm) (see table 1 below), and the lighting devices transmitting RSSI values other than the highest RSSI value may be outputted as a sub-picture by a setting. Also, while the lighting device transmitting the RSSI value of not less than the preset RSSI value is outputted on the control unit, the embodiment is not limited thereto and the lighting device transmitting a weak RSSI value may be also outputted on the control unit by a setting.

The switch application of the lighting device to be controlled is outputted on the display unit of the lighting control device according to the RSSI values received from the lighting devices.

The switch application is outputted on the display unit of the lighting control device by a control of the lighting control device.

Figure 4:
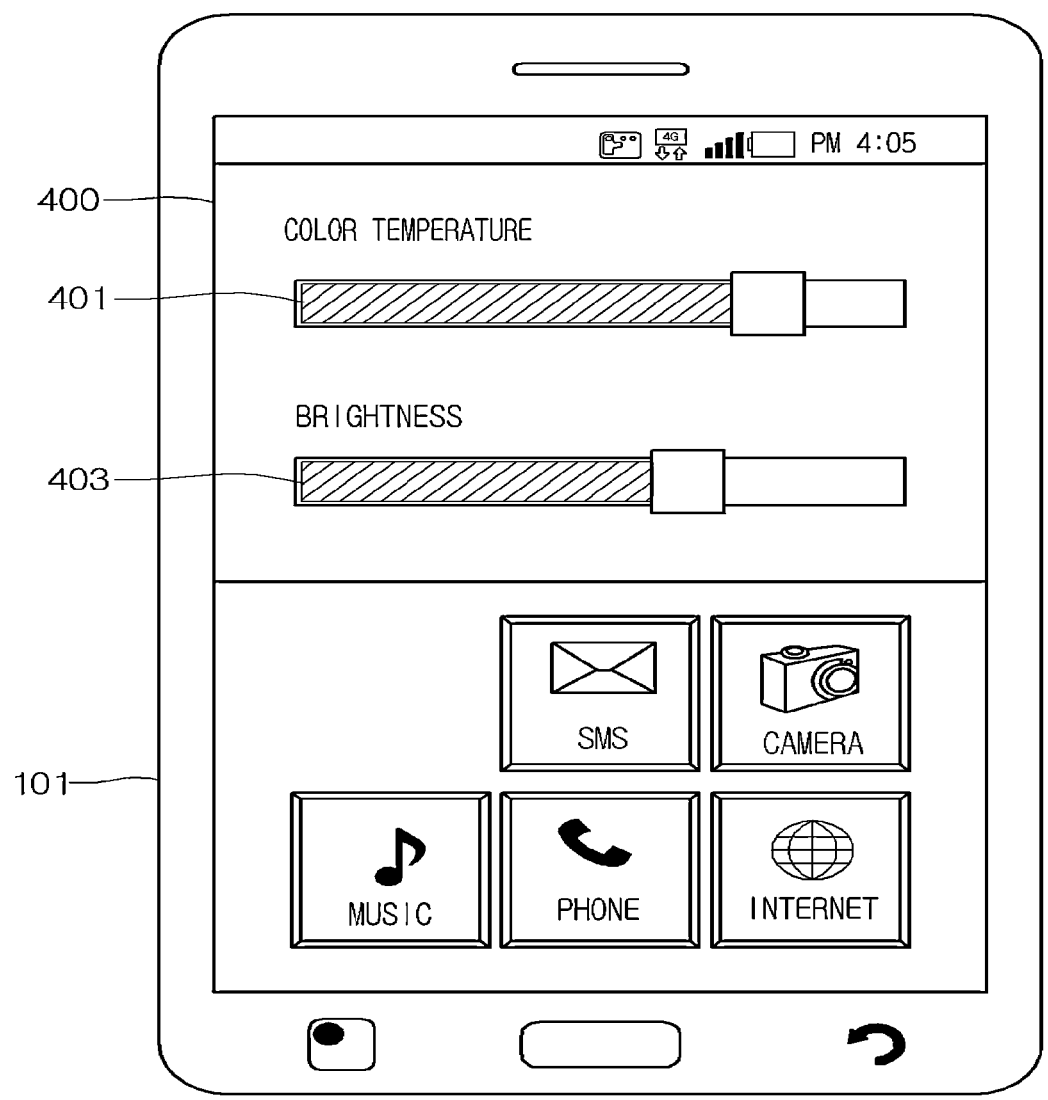
FIG. 4 illustrates a user interface (UI) of a lighting control device.

The UI including control information as shown in FIG. 4 or 8 may be outputted by the switch application.

The lighting devices are automatically controlled or manually controlled by a user according to the RSSI received from the lighting devices and the color temperature or/and brightness information stored corresponding to the RSSI.

That is, when a miniaturization module implementing a wireless communication technology, such as WiFi, Zigbee, or Bluetooth and including an antenna is built in the lighting device, it is possible to realize the control of an emotional lighting in which the lighting devices are automatically turned on or at least of the brightness and color temperature of the lighting devices are automatically/manually controlled. Therefore, the brightness/color temperature of the lighting devices may be set to be automatically controlled according to the RSSI.

TABLE 1

| RSSI | Color Temperature | Brightness |
|---|---|---|
| −40 dBm | 6000 K | 100 dimming |
| −60 dBm | 5000 K | 80 |
| −80 dBm | 4000 K | 40 |
| −100 dBm | 3000 | 20 |

Also, in embodiments, the lighting control device may automatically turn on/off the lighting devices according to the RSSI received from the lighting devices.

Referring to table 1, when the received RSSI is not less than a preset RSSI value (e.g., −80 dBm), the lighting device is controlled to be turned on, and when the received RSSI is not more than a preset RSSI value (e.g., −100 dBm), the lighting device may be controlled to be turned off.

Also, the lighting control device may control the lighting devices such that when the RSSI is gradually increased, the color temperature or/and brightness is gradually increased corresponding to such an increase, and on the contrary, when the RSSI is gradually decreased, the color temperature or/and brightness is gradually decreased.

FIG. 2B is a block diagram of the lighting device.

As shown in FIG. 2B, the lighting device 111 includes: a power unit 213; a communication unit 215 including a module for WiFi, Zigbee or Bluetooth communication and transmitting/receiving a signal to/from the lighting control device 101; a storage unit 214 storing lighting control information, an operation program, or/and identification information for the lighting control device; and a control unit 217 controlling the lighting device.

In the embodiments, the lighting control device 101 is a wireless control device, such as a smart phone including a handheld terminal using Zigbee, Bluetooth, WiFi communication method, and the lighting device 111 uses the above-mentioned communication method and includes an LED lamp, a fluorescent lamp, a glow lamp, a halogen lamp, and the like.

The lighting control device 101 may measure the RSSI of the lighting device according to a signal outputted from the communication unit of the lighting device to control the lighting device according to the measured RSSI.

FIG. 3 is a schematic view showing receipt of RSSI and that the lighting control device controls the lighting devices according to the received RSSI.

As shown in FIG. 3, in a state that powers of the lighting control device 101 and the lighting device part 111 including one or more unit lighting devices 302, 303, 304 are turned on, a control mode for the control of the lighting device among operation modes of a smart phone that is one example of the lighting control device is selected.

The smart phone receives a signal (RSSI) from the lighting device, the control unit (see 202 of FIG. 2A) compares the received RSSI with a preset RSSI value to allow at least one of the following control operations to be performed.

1) Controlling brightness or/color temperature of each lighting device according to the received RSSI.

2) A switch application for a near distance lighting device by the RSSI is operated to display a UI and the lighting device is controlled according to the RSSI.

3) On/Off of the lighting device is controlled according to the received RSSI or the level of brightness or/and color temperature is gradually elevated or lowered.

FIG. 4 is a schematic view illustrating a user interface (UI) of the lighting control device 101.

FIG. 4 is an example of a UI 400 able to control at least one of color temperature 401 and brightness 403 of the lighting device.

The color temperature or/and brightness outputted to the UI may be manually controlled by a user, or may be automatically controlled in the preset state shown in table 1 according to the received RSSI.

Figure 5A:
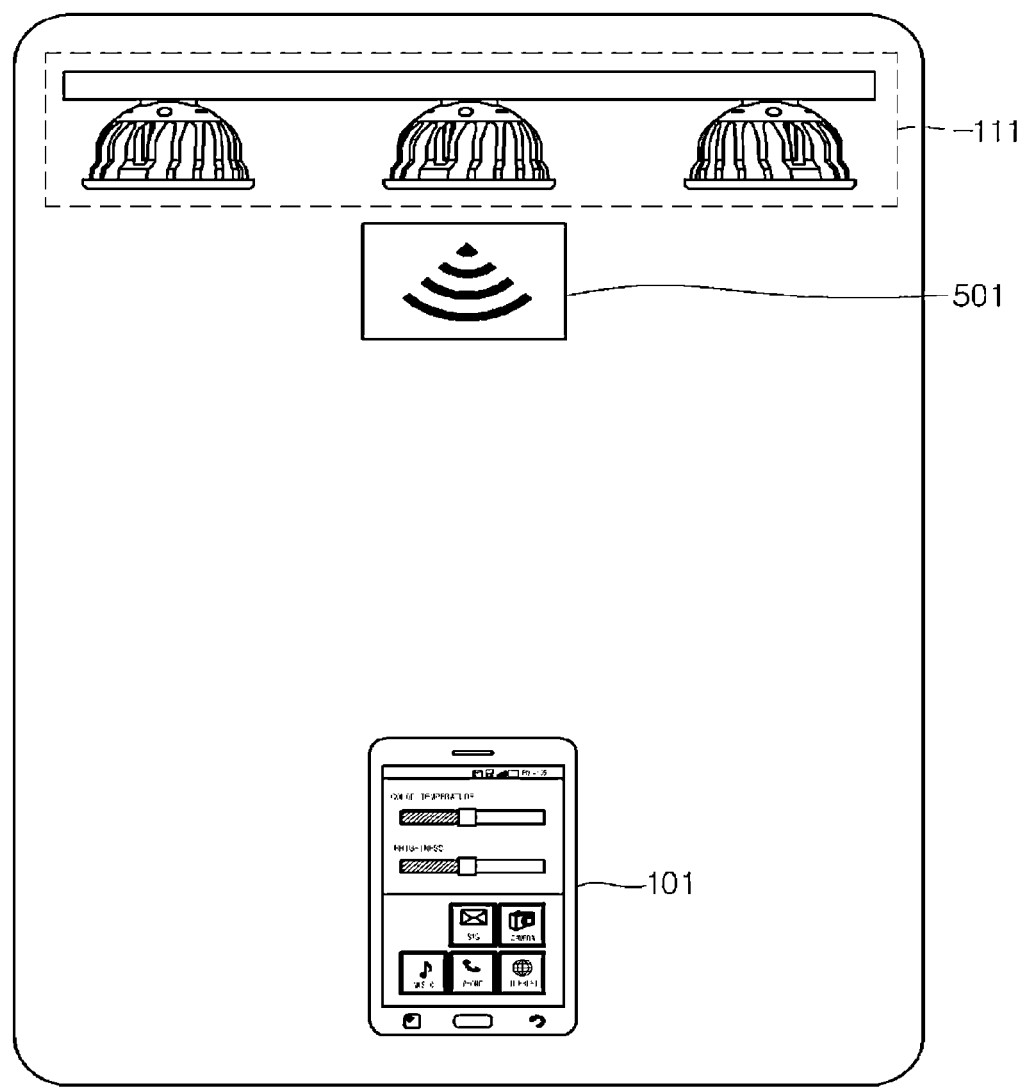
FIGS. 5A, 5B, and 5C are schematic views illustrating that RSSI varies with a distance between a lighting device and a lighting control device.
Figure 5B:
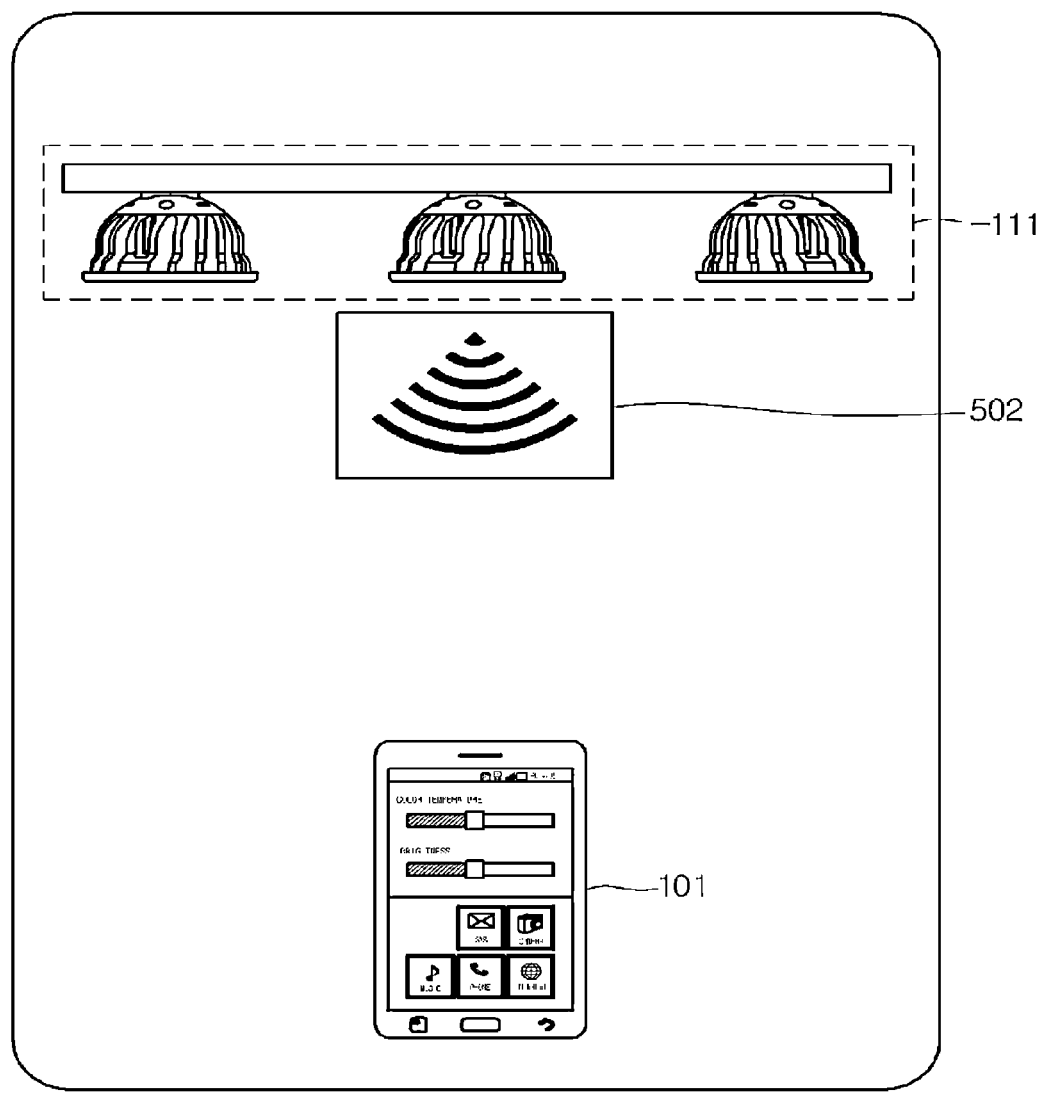
Figure 5C:
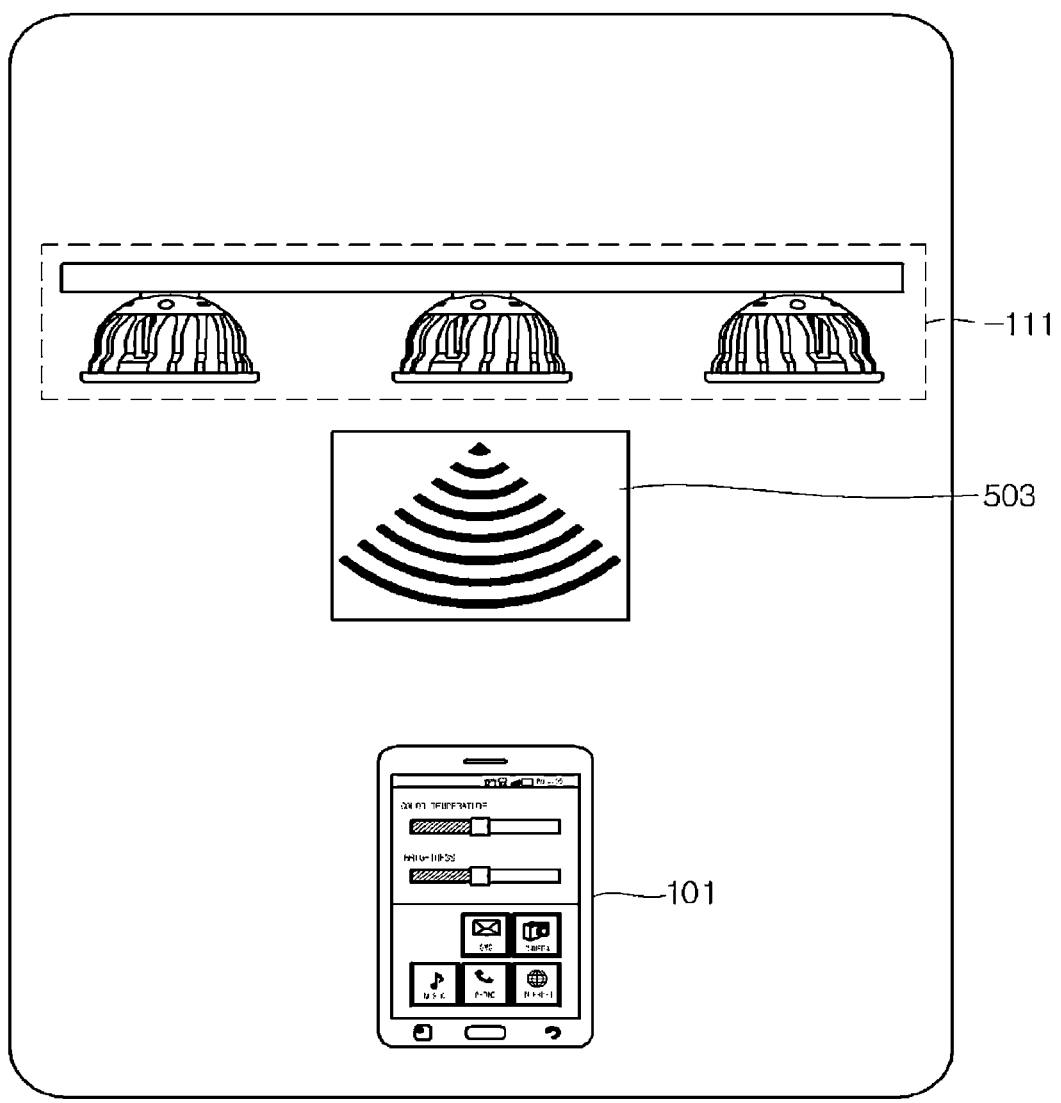

FIGS. 5A, 5B and 5C are schematic views illustrating that the RSSI varies with a distance between the lighting device 111 and the lighting control device 101.

As shown in the drawings, it can be seen that the RSSIs 501, 502, and 503 increase in the order of FIG. 5A→FIG. 5B→FIG. 5C.

That is, among FIGS. 5A, 5B, and 5C, the distance between the lighting device 111 of FIG. 5A and the lighting control device 101 is farthest, and the distance between the lighting device 111 of FIG. 5C and the lighting control device 101 is closest. Thus, it can be seen that the RSSI varies with the distance.

Figure 6:
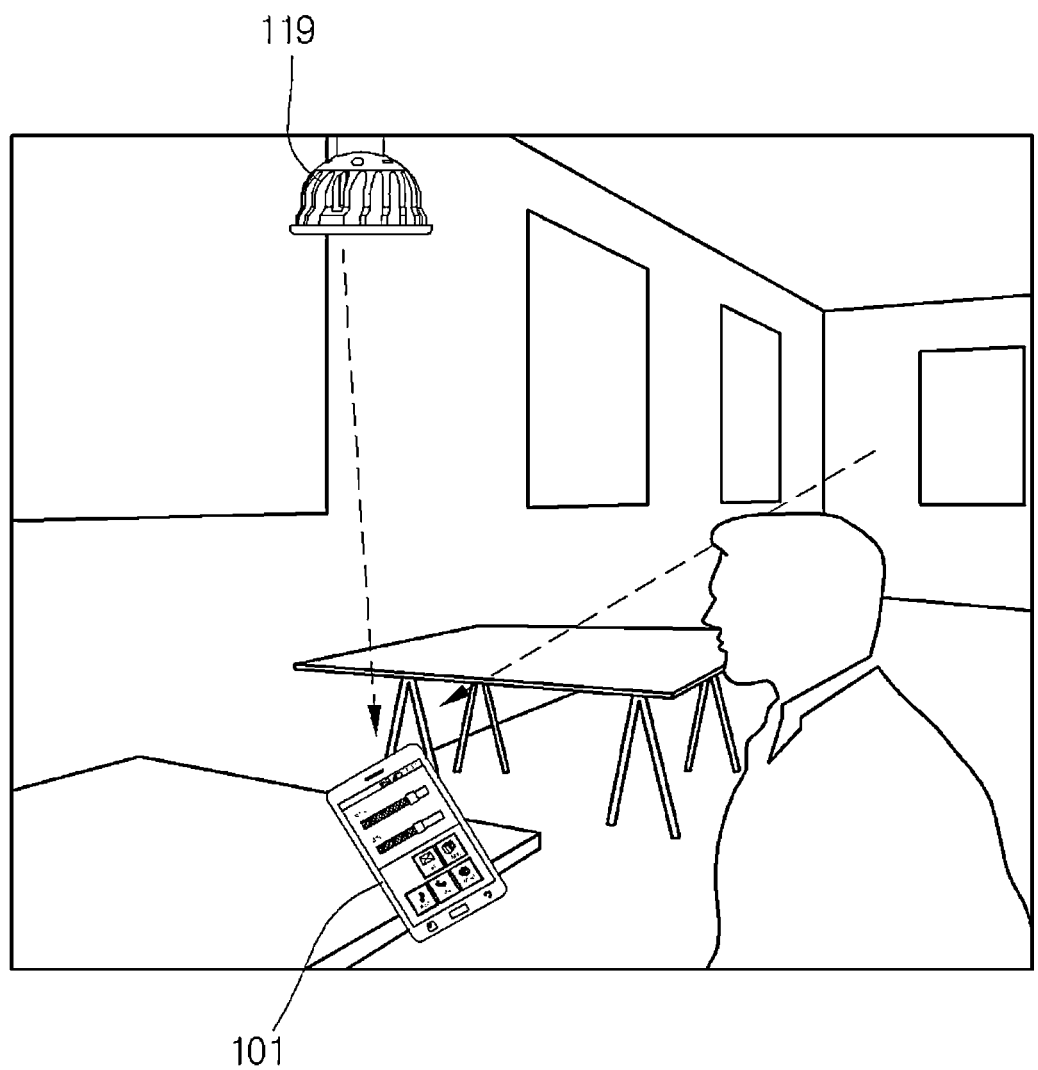
FIG. 6 is a schematic view illustrating that a UI is displayed on a lighting control device by a switch application of a near distance lighting device according to the RSSI and the color temperature or/and brightness is controllable based on the displayed UI.

FIG. 6 is a schematic view illustrating that a UI is displayed on the lighting control device 101 by a switch application of a near distance lighting device 119 and the level of color temperature or/and brightness is controllable via the displayed UI.

As shown in FIG. 6, when a user having the lighting control device moves to the left side where the lighting device is installed, the UI for the near distance lighting device 119 having the highest RSSI among the received RSSIs is displayed on the lighting control device 101 by an operation of the switch application, and the level of color temperature or/and brightness is automatically/manually controllable via the displayed UI.

In the embodiments or description, the manual control means a control by a user, and the automatically control means an automatic control by the control unit based on the information set and stored as shown in table 1.

Figure 7:
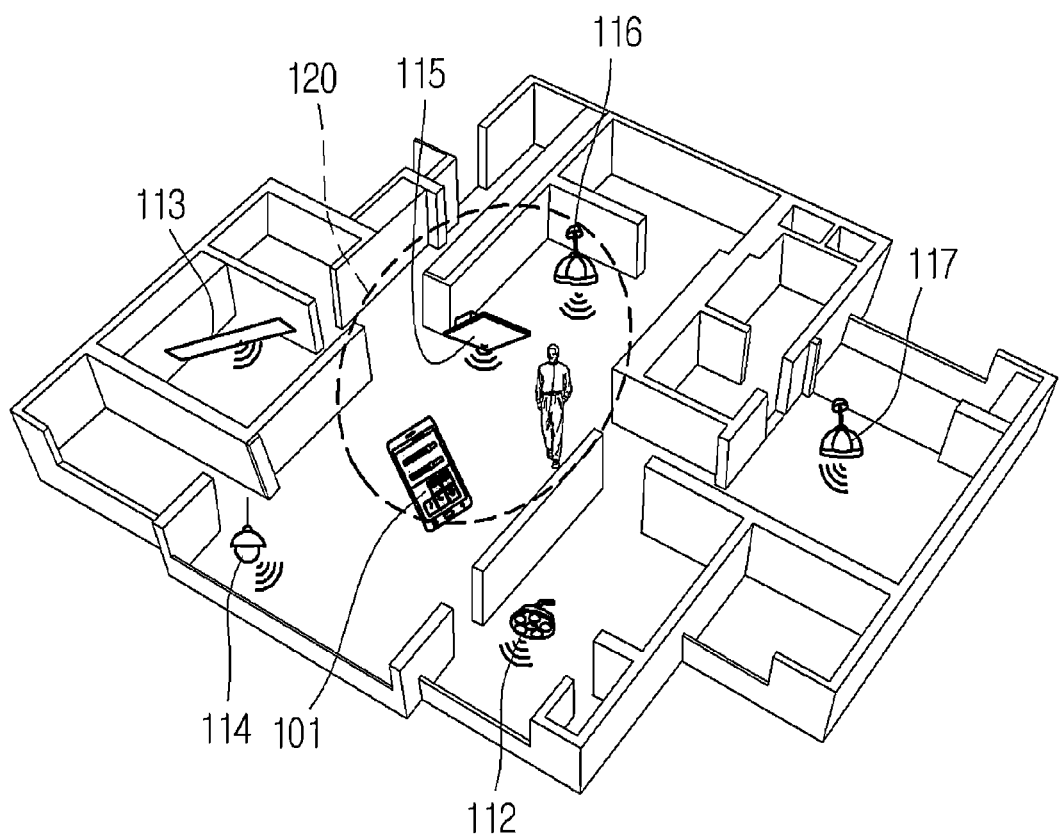
FIG. 7 is a schematic view illustrating that in a place where two or more lighting devices are installed or operated, a UI of only a lighting device having an RSSI value of not less than a preset RSSI value is outputted to realize convenience in control, a lighting device having a preset RSSI value is automatically turned on according to a setting, or the brightness or/and color temperature of the lighting device varies with the RSSI value.

FIG. 7 is a schematic view illustrating that in a place where a plurality of lighting devices 112, 113, 114, 115, 116, and 117 are installed or operated, the switch application for only the lighting device having the RSSI value of not less than a preset RSSI value is outputted on the lighting control device 101 to realize convenience in control.

FIG. 7 also illustrates that the lighting device having the RSSI value of not less than the preset RSSI value is automatically turned on or the brightness or/and color temperature of the lighting device may vary with the RSSI.

As shown in FIG. 7, the switch applications of a minimum number (i.e., one or more) of lighting devices 115, 116 existing in a corresponding region may be displayed on the lighting control device 101 to enhance a user's convenience in control. Meanwhile, in case a user having the lighting control device 101 moves, the switch application for another lighting device is outputted according to the RSSI and the color temperature/brightness will be controlled.

Also, the lighting device having the RSSI value of not less than the preset RSSI value is automatically turned on based on the set information of table 1, and the brightness or/and color temperature of the lighting device varies with the RSSI to enable an emotional control of lighting.

Also, when a user having the lighting control device enters a place where the lighting device is installed, the lighting device is automatically turned on, and when the user approaches or moves away the lighting device, the level of brightness/color temperature is elevated or lowered to enable the emotional control of lighting according to the preset RSSIs.

FIG. 8 is a schematic view illustrating that lighting control information 801, 802, 803, and 804 of one or more lighting devices to be controlled is outputted in UIs by a switch application of a lighting control device.

As illustrated in FIG. 8, it is general that as a result of comparison of the RSSI values by the control unit, the UI 801 displaying the lighting control information for controlling only the lighting device having the highest RSSI is outputted on the lighting control device 101.

The embodiments, however, is not limited thereto, and as illustrated in FIG. 8, UIs 802, 803, and 804 displaying the lighting control information for the lighting devices having the RSSI values of not less than the preset RSSI value may be outputted as sub-pictures together with the UI 801.

Therefore, the user may control the UIs manually, or the UIs may be automatically controlled by the control unit.

Figure 9:
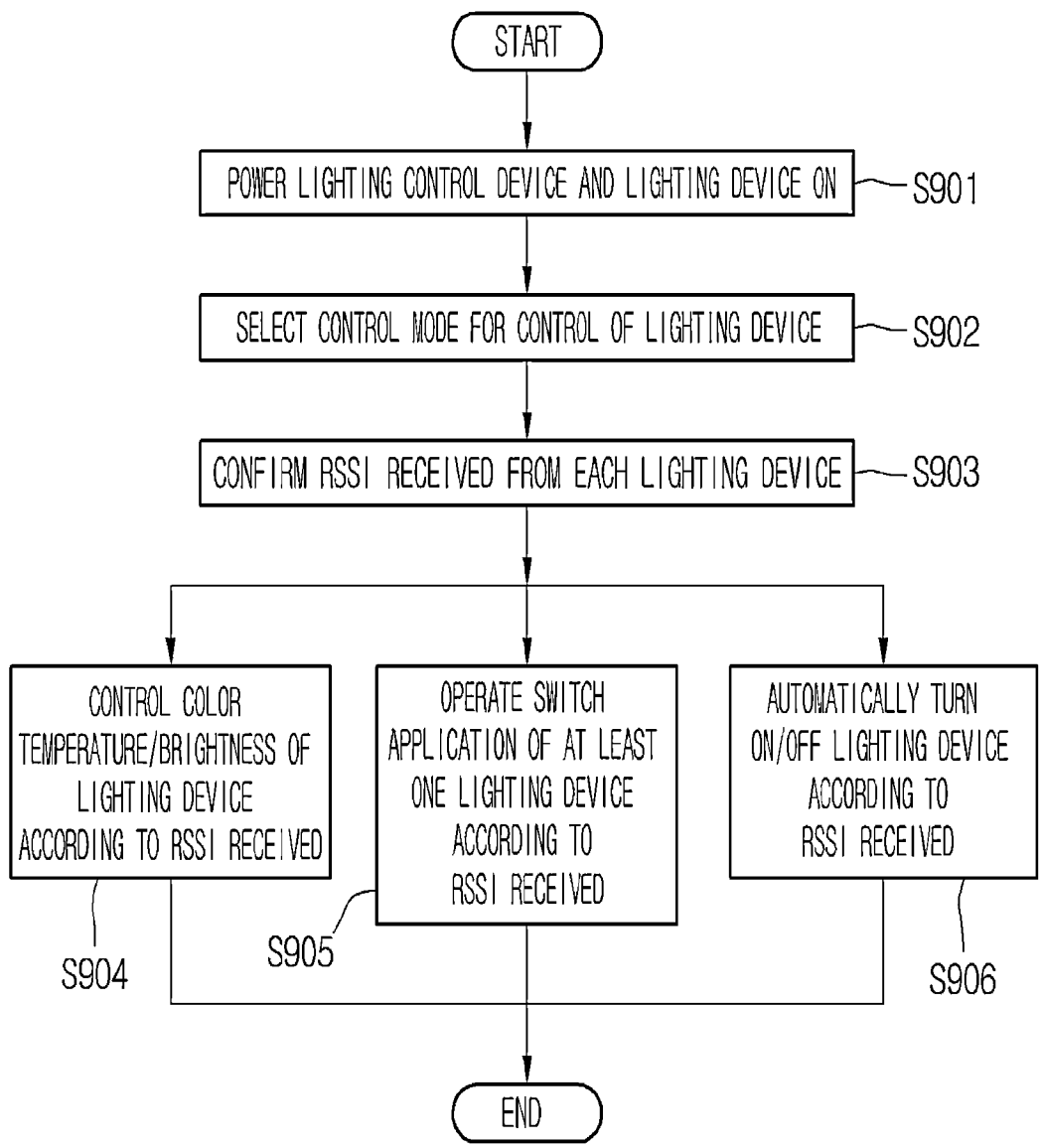
FIG. 9 is a flow diagram showing a control of a lighting device based on an RSSI.

FIG. 9 is a flow diagram showing a control of a lighting device based on an RSSI.

As illustrated in FIGS. 3 and 9, the lighting control device 101 and the respective lighting devices 111 are powered on (S901).

Among functions of the lighting control device 101, the control mode for the control of the lighting device is selected (S902).

The RSSI values received from the respective lighting devices are confirmed by the control unit (S903).

The received RSSI values and the control information (i.e., color temperature/brightness) of the lighting devices stored corresponding to the received RSSI values are confirmed, and the color temperature/brightness may be controlled as shown in table 1 according to the received RSSI values (S904).

That is, according to the confirmed results, at least one of the color temperatures and the brightness of the lighting devices is controlled.

Alternatively, the switch application for the near distance lighting device to be controlled according to the received RSSI value is operated to output the UI to the display unit of the lighting control device, and a control may be performed via the outputted UI (S905).

Alternatively, when the RSSI is received from the lighting device, the lighting devices may be controlled to be turned on or off according to the RSSI (S906).

For example, the lighting devices are controlled such that the lighting device having the RSSI value of not less than the preset RSSI value is turned on, or the lighting device having the RSSI value of not more than the preset RSSI value or not receiving the RSSI is turned off. Also, the lighting devices may be controlled such that the level of color temperature/brightness thereof is gradually increased or decreased according to the RSSI.

Figure 10:
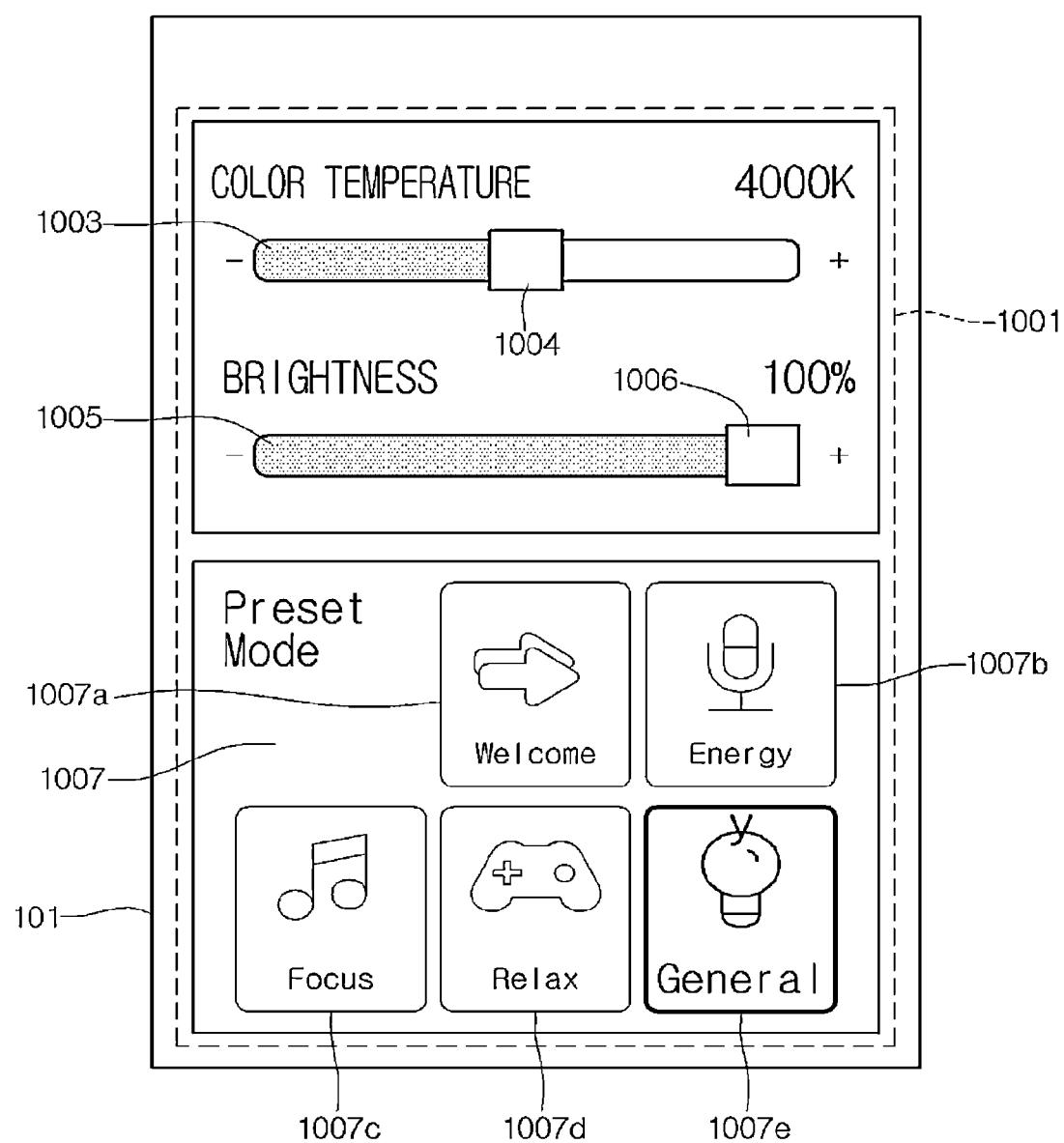
FIG. 10 is a schematic view illustrating a UI picture on which preset lighting modes are displayed on a lighting control device controlling a lighting device.

FIG. 10 is a schematic view illustrating a UI picture 1001 on which preset lighting modes are displayed on a lighting control device 101 controlling lighting devices.

As illustrated in FIG. 10, the lighting control information includes at least a color temperature 1003 or/and a brightness 1005, current values of the color temperature 1003 and the brightness 1005 are displayed through display units 1004 and 1006, and a plurality of lighting modes 1007 (1007a to 1007a) are set in icons and displayed.

By moving the scroll bars 1004 and 1006 indicating the respective current values of the color temperature 1003 and the brightness 1005 to the left/right, the color temperature and/or brightness set according to the respective lighting modes may be changed/controlled according to a user's taste.

In an example, the lighting control information set according to the respective lighting modes may be indicated as in table 2 below.

TABLE 2

| Lighting Mode | Color Temperature | Brightness |
|---|---|---|
| WELCOME | 2700 K-6500 K (slowly varied) | 100% |
| Energy | 6500 K | 80% |
| FOCUS | 5700 K | 100% |
| RELAX | 2700 K | 70% |
| General | 4000 K (default value) | 100% (default value) |

In the lighting modes, the lighting control information and the corresponding icons 1007a to 1007e set as in table 2, default values in an initial lighting control mode are set to 4000K, 100%, and light ON corresponding to the general mode. The embodiments, however are not limited thereto, and the operation mode may be changed to another mode having different values.

Also, when an icon for another lighting mode is pushed, the lighting control device is operated in the lighting control information set for the pushed icon and the selected icon is activated.

Also, by controlling the scroll bars 1004 and 1006, desired different color temperature or brightness may be set and in that case, the activated icon is converted to an inactivated state.

However, it will be possible that the activated icon maintains the current activated state by a setting.

FIG. 10 illustrates that the lighting control device 101 is set to default values (color temperature: 4000K, brightness: 100%) of the initial lighting control mode and operated.

As illustrated in the drawing, when a user selects the lighting control mode of the lighting control device, the General Icon 1007e is activated and the color temperature and brightness are set to 4000 k and 100%, respectively.

Figure 11:
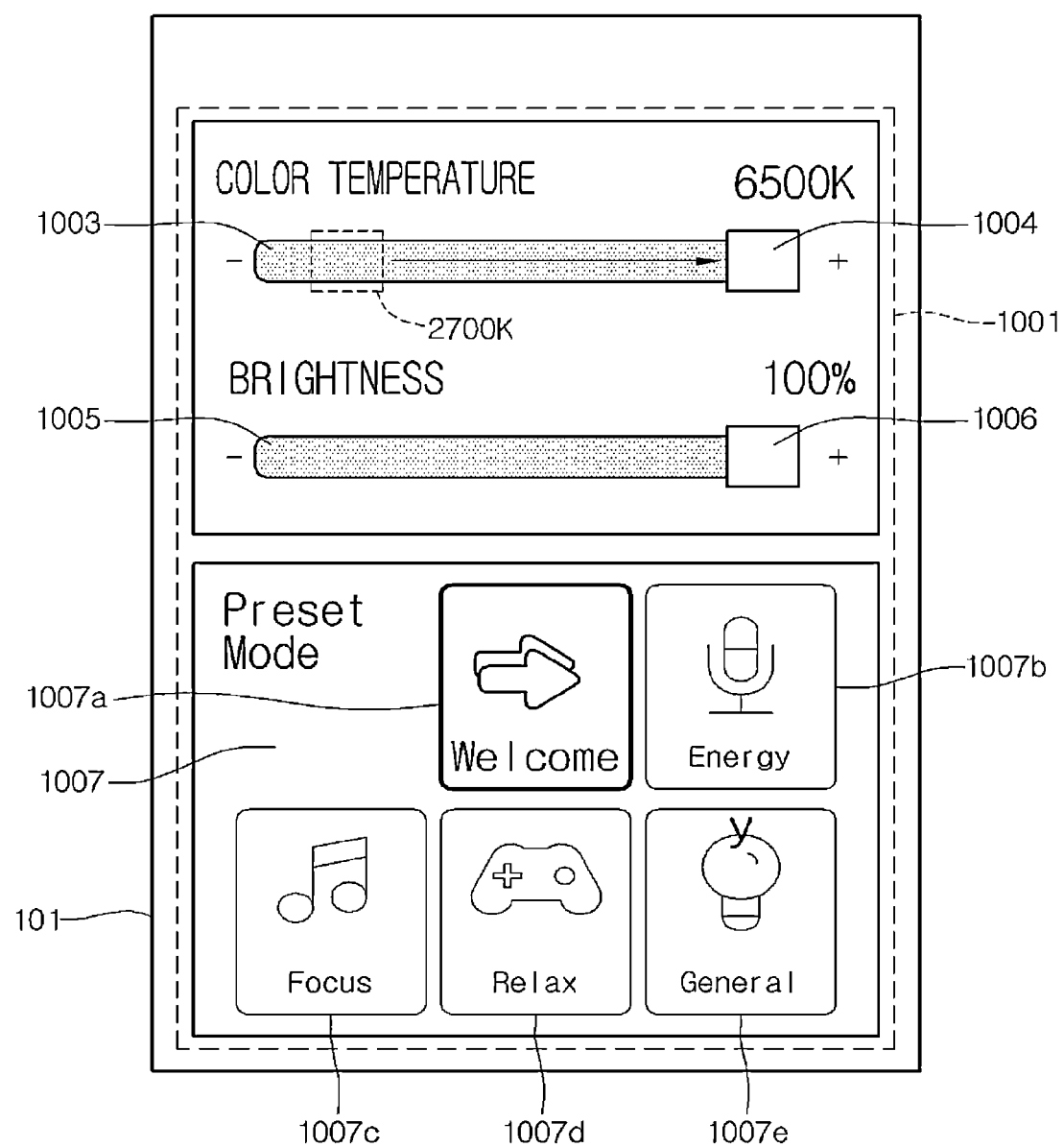
FIG. 11 is a UI picture indicating color temperature and brightness when a "Welcome" mode among the preset lighting modes is selected.

FIG. 11 is a UI picture indicating color temperature and brightness when a "Welcome" mode among the preset lighting modes is selected.

As illustrated in FIG. 11, it can be seen that the color temperature is changed from 2700K to 6500K. Of course, the brightness may be set to be changed.

When a user selects the Welcome Icon 1007a among the lighting control modes as illustrated in FIG. 11, the Welcome Icon is activated and the color temperature will be changed from 2700K as set to 6500K.

The color temperature may be set to a different value.

Figure 12:
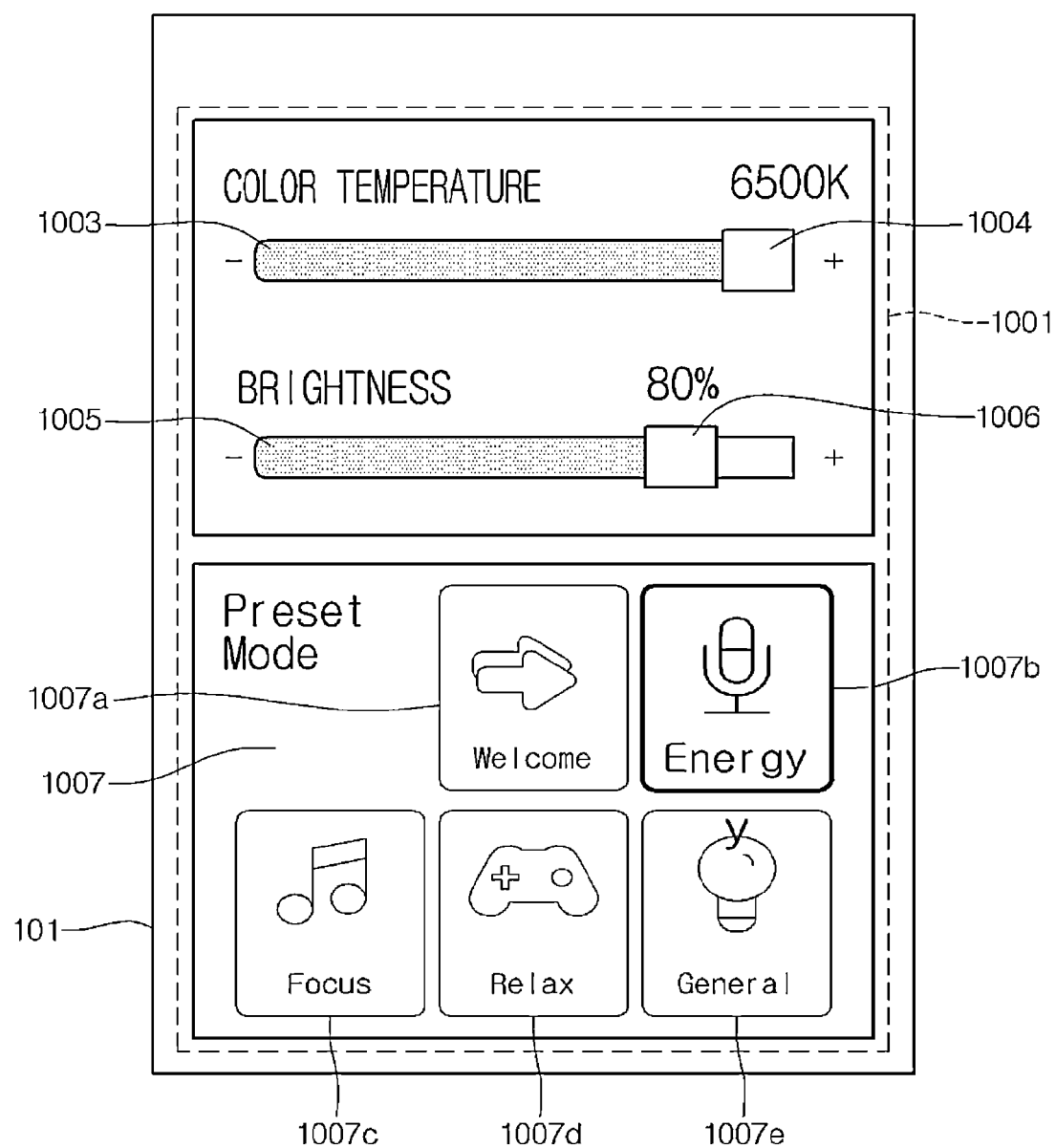
FIG. 12 is a UI picture indicating color temperature and brightness when an "Energy" mode among the preset lighting modes is selected.

FIG. 12 is a UI picture indicating color temperature and brightness when an "Energy" mode among the preset lighting modes is selected.

It is general that the color temperature/brightness of FIG. 12 is preset as shown in table 2.

When the user selects the Energy Icon 1007b among the lighting control modes, the Energy Icon is activated and the lighting control device 101 will be operated in the preset lighting control information (color temperature: 6500K, brightness: 80%).

Figure 13:
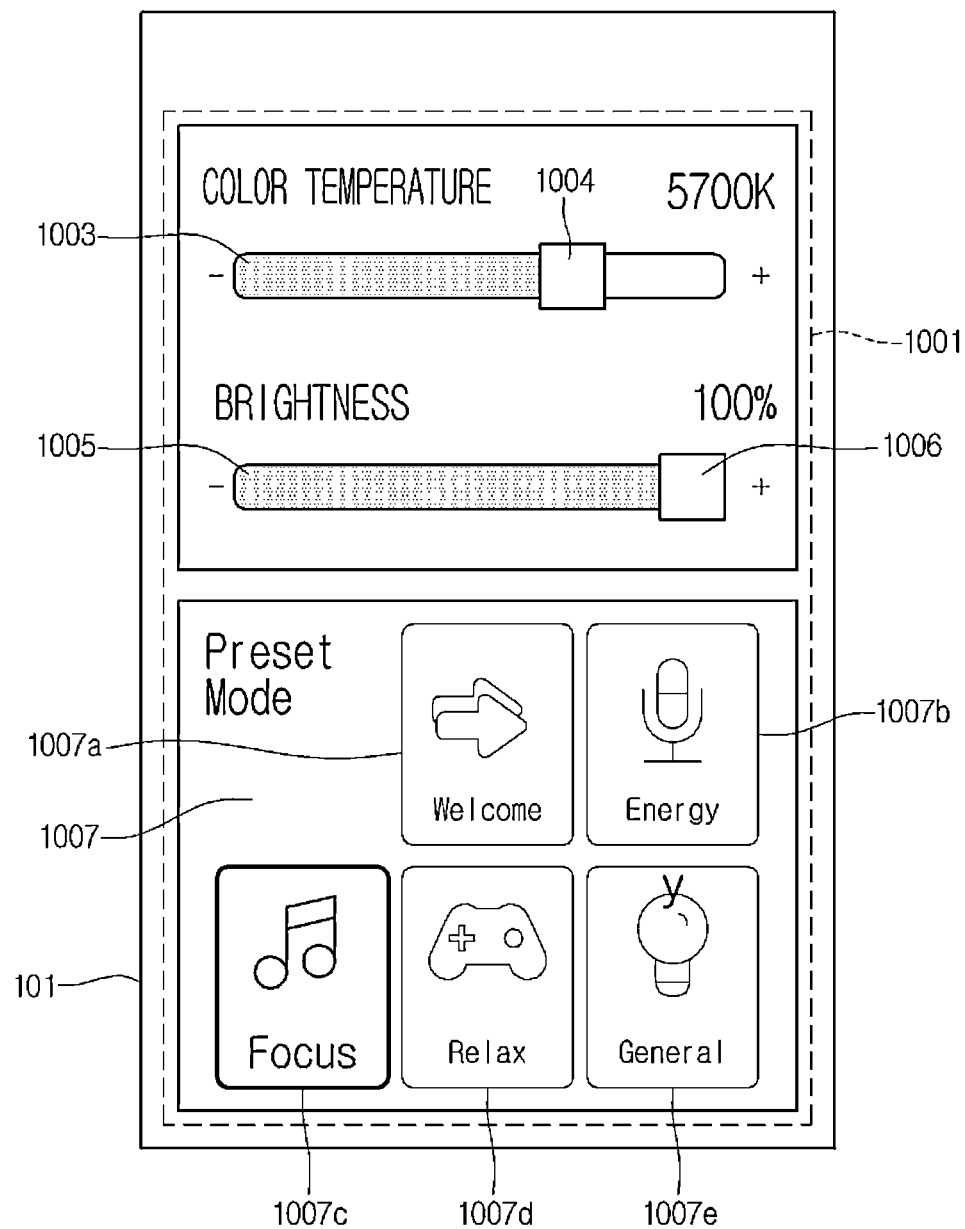
FIG. 13 is a UI picture indicating color temperature and brightness when a "Focus" mode among the preset lighting modes is selected.

FIG. 13 is a UI picture indicating color temperature and brightness when a "Focus" mode among the preset lighting modes is selected.

When the user selects the Focus Icon 1007c among the lighting control modes, the Focus Icon 1007c is activated and the lighting control device 101 will be operated in the preset lighting control information (color temperature: 5,700K, brightness: 100%).

Figure 14:
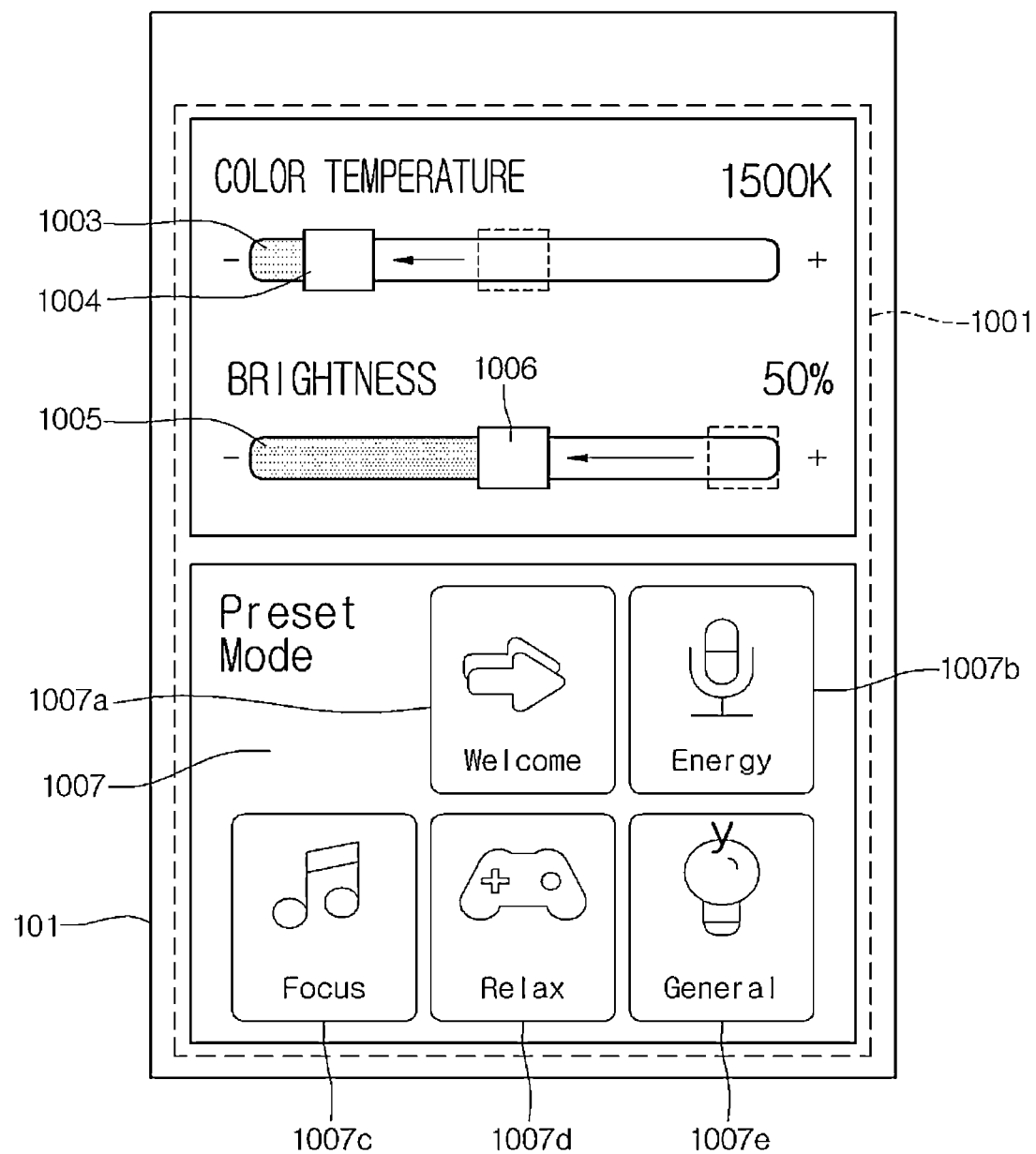
FIG. 14 is a UI picture indicating that at least one of color temperature and brightness is adjusted when a "RELAX" mode among the preset lighting modes is selected.

FIG. 14 is a UI picture indicating color temperature and brightness when a "Relax" mode among the preset lighting modes is selected.

When the user selects a Relax Icon 1007d among the lighting control modes, the Relax Icon 1007d is activated and the lighting control device 101 will be operated in the preset lighting control information (color temperature: 2,700K, brightness: 70%).

Thereafter, as illustrated in FIG. 14, the color temperature of 2,700K in the Relax mode is changed to 1,500K, and the brightness is changed from 700% to 50%. Thus, the RELAX Icon in the activated state is converted to an inactivated state.

Figure 15:
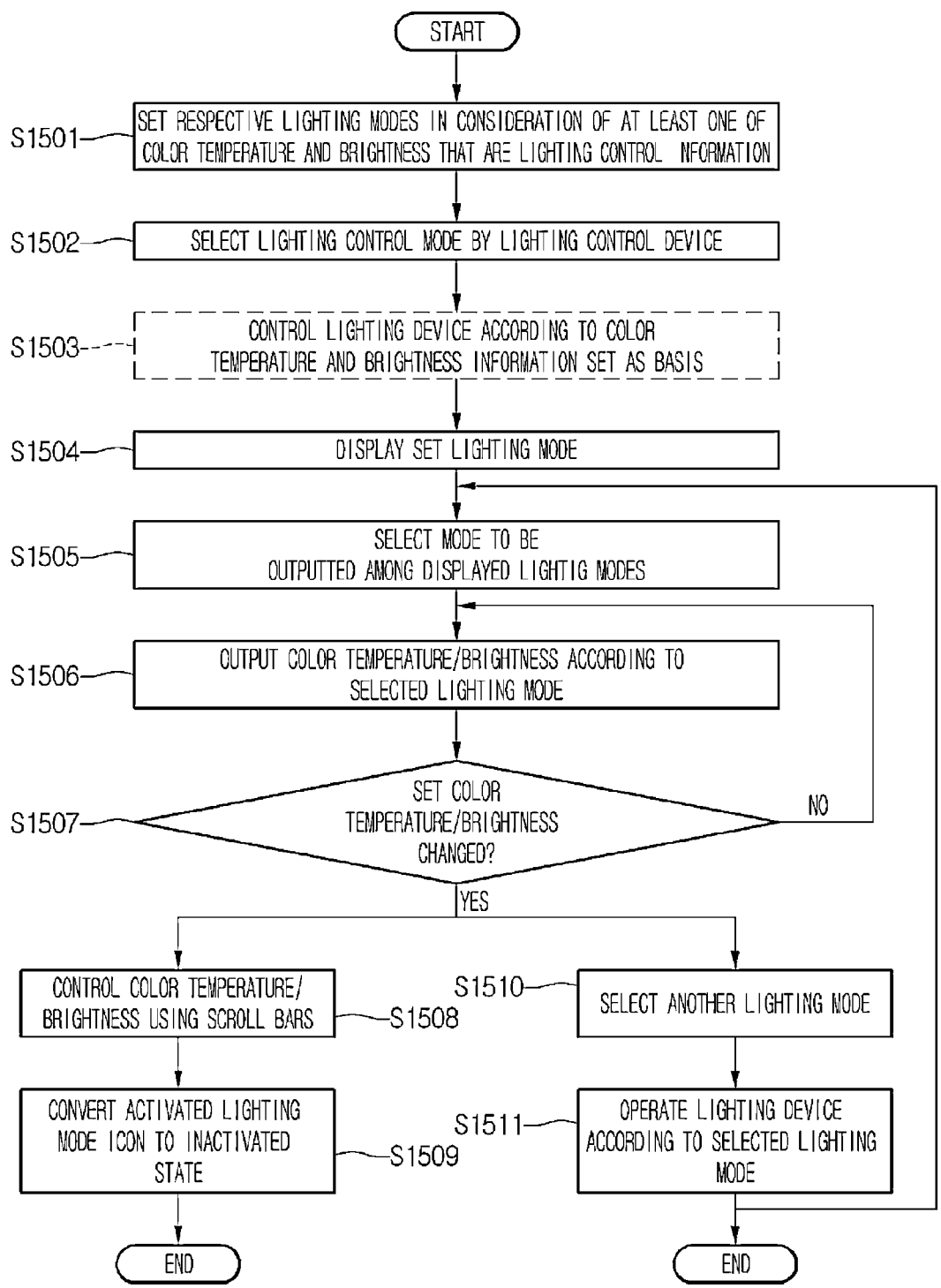
FIG. 15 is a flow diagram showing that the respective lighting modes are expressed in UI pictures and are selected and controlled by a user's selection.

FIG. 15 is a flow diagram showing that the respective lighting modes are expressed in UI pictures and are selected and controlled by a user's selection.

As shown in FIG. 15 and table 2, two or more lighting modes are set by at least one of the color temperature and brightness, and are then stored in the storage unit 204 of the lighting control device 101 and the storage unit 214 of the lighting device 111, respectively (S1501).

A lighting control mode is selected through the input unit 206 of the lighting control device (S1502).

The preset lighting mode is displayed on the UI picture, and the lighting device is controlled according to the lighting control information set as default values (S1503, S1504).

Thereafter, among the displayed lighting modes, the mode to be outputted is selected by the user, and the color temperature and brightness illustrated in FIGS. 11 to 14 according to the selected mode are outputted (S1505, S1506).

Meanwhile, in the state set and outputted as above, by moving the scroll bars or selecting another mode, the lighting control device may be operated with the changed lighting control information values (S1507, S1508, S1510, S1511).

As the lighting control information is changed, the activated Icon of the lighting control mode is converted to an inactivated state (S1509).

The change of the lighting control information will be possible by controlling the means (e.g., scroll bars, cursor, etc.) indicating the current states of the color temperature and brightness.

By moving the scroll bars or selecting another lighting mode in the above, the activated icon of the selected lighting mode is converted to an inactivated state, and the newly selected icon is activated.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting control system, comprising:
a lighting device; and
a graphical user interface for controlling the lighting device and configured to be displayed on a touch screen of a lighting control device,
wherein the graphical user interface comprises:
a first display region displaying a menu having two or more lighting control modes; and
a second display region displaying a current value of at least one of color temperature and brightness of the lighting device;
wherein control information of the two or more lighting control modes is preset, wherein the control information comprises color temperature and brightness of the lighting device;
wherein the second display region is configured to allow a user to manually change the current value of at least one of color temperature and brightness of the lighting device;
wherein each lighting control mode on the menu of the first display region comprises an icon corresponding to said lighting control mode;
wherein the lighting control system is configured such that, when a lighting control mode of the two or more lighting control modes is selected, the first display region highlights the icon of the selected lighting control mode on the menu, relative to the icon or icons of the remaining, non-selected lighting control mode or modes, and the current value of at least one of color temperature and brightness of the lighting device changes in the second display region according to the preset control information of the selected lighting control mode;
wherein each lighting control mode on the menu of the first display region further comprises text displayed within the icon corresponding to said lighting control mode, and wherein the text corresponds to said lighting control mode;
wherein the current level of brightness of the lighting device is displayed on a scrollbar in the second display region;
wherein scrollbar text is displayed in the second display region adjacent to the scrollbar;

wherein said scrollbar text identifies the scrollbar as a brightness scrollbar;

wherein the scrollbar comprises a scroll region and a current level indicator;

wherein the current level indicator indicates the current level of the brightness of the lighting device;

wherein the graphical user interface is configured such that any visible portion of the scroll region for brightness values lower than the current level indicator has a different level of shading than any visible portion of the scroll region for brightness values higher than the current level indicator;

wherein the two or more lighting control modes are each configured to reflect a mood of a user; and wherein the two or more lighting control modes comprise a Relax mode, a Focus mode, and an Energy mode.

2. The lighting control system of claim 1, wherein the lighting control device is a smartphone and wherein the graphical user interface is part of application software for the smartphone.

3. The lighting control system of claim 1, wherein the color temperature of the lighting device is 6500 K for the Energy mode.

4. The lighting control system of claim 1, wherein the color temperature of the lighting device in the Energy mode is higher than the color temperature of the lighting device in the Focus mode, and wherein the color temperature of the lighting device in the Focus mode is higher than the color temperature of the lighting device in the Relax mode.

5. The lighting control system of claim 1, wherein the lighting device comprises three LED lighting devices.

6. The lighting control system of claim 5, wherein the lighting device further comprises a control unit, a communication unit, a storage unit and a power unit.

7. The lighting control system of claim 1, wherein the graphical user interface is configured to allow the user to change the current value of at least one of color temperature and brightness of the lighting device via wireless communication with the lighting device.

8. The lighting control system of claim 1, wherein the lighting control system is configured such that, when a lighting control mode of the two or more lighting control modes is selected, the current value of color temperature and the current value of brightness of the lighting device both change in the second display region according to the preset control information of the selected lighting control mode.

9. A lighting device control method, the method comprising:

storing two or more lighting control modes and a graphical user interface on a lighting control device, wherein control information of the two or more lighting control modes is preset, wherein the control information comprises color temperature and brightness of the lighting device;

adjusting at least one of color temperature and brightness of the lighting device by providing adjustment information using the graphical user interface;

displaying a current value of at least one of the color temperature and brightness of the lighting device on the graphical user interface; and controlling the lighting device according to the adjustment information provided to the graphical user interface, wherein the graphical user interface comprises:

a first display region displaying a menu having the two or more lighting control modes; and a second display region displaying the current value of at least one of color temperature and brightness of the lighting device;

wherein the second display region is configured to allow a user to input adjustment information to manually change the current value of at least one of color temperature and brightness of the lighting device;

wherein each lighting control mode on the menu of the first display region comprises an icon corresponding to said lighting control mode;

wherein the lighting control system is configured such that, when a lighting control mode of the two or more lighting control modes is selected, the first display region highlights the icon of the selected lighting control mode on the menu, relative to the icon or icons of the remaining, non-selected lighting control mode or modes, and the current value of at least one of color temperature and brightness of the lighting device changes in the second display region according to the preset control information of the selected lighting control mode;

wherein each lighting control mode on the menu of the first display region further comprises text displayed within the icon corresponding to said lighting control mode, and wherein the text corresponds to said lighting control mode;

wherein the current value of brightness of the lighting device is displayed on a scrollbar in the second display region;

wherein scrollbar text is displayed in the second display region adjacent to the scrollbar;

wherein said scrollbar text identifies the scrollbar as displaying the current value of brightness of the lighting device;

wherein the scrollbar comprises a scroll region and a current value indicator;

wherein the current value indicator indicates the current value of the brightness of the lighting device;

wherein the graphical user interface is configured such that any visible portion of the scroll region for brightness values lower than the current value indicator has a different level of shading than any visible portion of the scroll region for brightness values higher than the current value indicator;

wherein the two or more lighting control modes are each configured to reflect a mood of a user; and wherein the two or more lighting control modes comprise a Relax mode, a Focus mode, and an Energy mode.

10. The method of claim 9, wherein the lighting control system is a smartphone and wherein the graphical user interface is part of application software for the smartphone.

11. The method of claim 9, wherein the color temperature of the lighting device is 6500 K for the Energy mode.

12. The method of claim 9, wherein the color temperature of the lighting device in the Energy mode is higher than the color temperature of the lighting device in the Focus mode, and wherein the color temperature of the lighting device in the Focus mode is higher than the color temperature of the lighting device in the Relax mode.

13. The method of claim 9, wherein the lighting device comprises three LED lighting devices.

14. The method of claim 9, wherein the graphical user interface is configured to allow the user to change the current value of at least one of color temperature and brightness of the lighting device via wireless communication with the lighting device.

15. The method of claim 9, wherein the lighting control system is configured such that, when a lighting control mode of the two or more lighting control modes is selected, the current value of color temperature and the current value of brightness of the lighting device both change in the second display region according to the preset control information of the selected lighting control mode.

\* \* \* \* \*